United States Patent [19]

Auld

[11] Patent Number: 5,686,965
[45] Date of Patent: *Nov. 11, 1997

[54] TWO-PART SYNCHRONIZATION SCHEME FOR DIGITAL VIDEO DECODERS

[75] Inventor: David R. Auld, San Jose, Calif.

[73] Assignee: LSI Logic Corporation, Milpitas, Calif.

[*] Notice: The term of this patent shall not extend beyond the expiration date of Pat. No. 5,452,006.

[21] Appl. No.: 529,687

[22] Filed: Sep. 18, 1995

Related U.S. Application Data

[63] Continuation of Ser. No. 143,316, Oct. 25, 1993, Pat. No. 5,452,006.

[51] Int. Cl.$^6$ .............................. H04N 7/12; H04N 11/02
[52] U.S. Cl. ...................... 348/423; 348/465; 348/462
[58] Field of Search ................................ 348/390, 423, 348/384, 385, 387, 388, 512, 471, 472, 473, 465, 462, 461, 467, 464; 375/365, 366, 368; 370/105.3, 106, 91; H04N 7/12, 11/02, 9/475

[56] References Cited

U.S. PATENT DOCUMENTS

| | | |
|---|---|---|
| 5,216,503 | 6/1993 | Paik et al. ............................. 348/390 |
| 5,414,650 | 5/1995 | Hekhuis ............................ 364/715.02 |
| 5,452,006 | 9/1995 | Auld ........................................ 348/390 |

*Primary Examiner*—Michael H. Lee
*Attorney, Agent, or Firm*—Oppenheimer Poms Smith

[57] ABSTRACT

A novel synchronization scheme for use in connection with digital signal video decoder comprises a pre-parser, a channel buffer, and a post-parser. The pre-parser synchronizes to a multiplexed system bitstream received from a fixed rate channel. The video bitstream component of a multiplexed system bitstream is then extracted and synchronized prior to being transferred bit-serially from the pre-parser to a channel buffer. The post-parser is coupled to the channel buffer and to a video decoder in a series configuration. The post-parser separates the various layers of video data from the video bitstream component. The post-parser performs a translation operation on the video bitstream component and converts the bitstream data into symbol data. The symbol data is subsequently processed by the video decoder so as to reconstruct an originally encoded picture or frame. Preferably, the multiplexed system bitstream data structure conforms to some format agreed upon among video digital businesses involved in transmission and reception. In accordance with one aspect of the present invention, the pre-parser and the post-parser operate independent of each other, and operate at different processing rates.

28 Claims, 6 Drawing Sheets

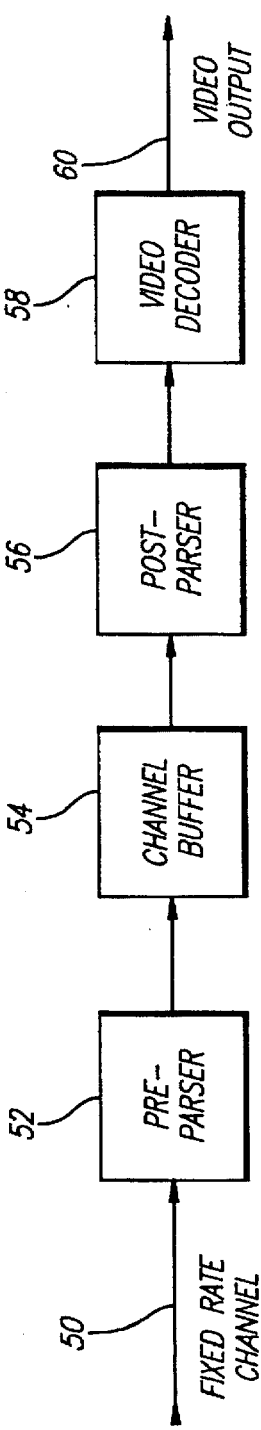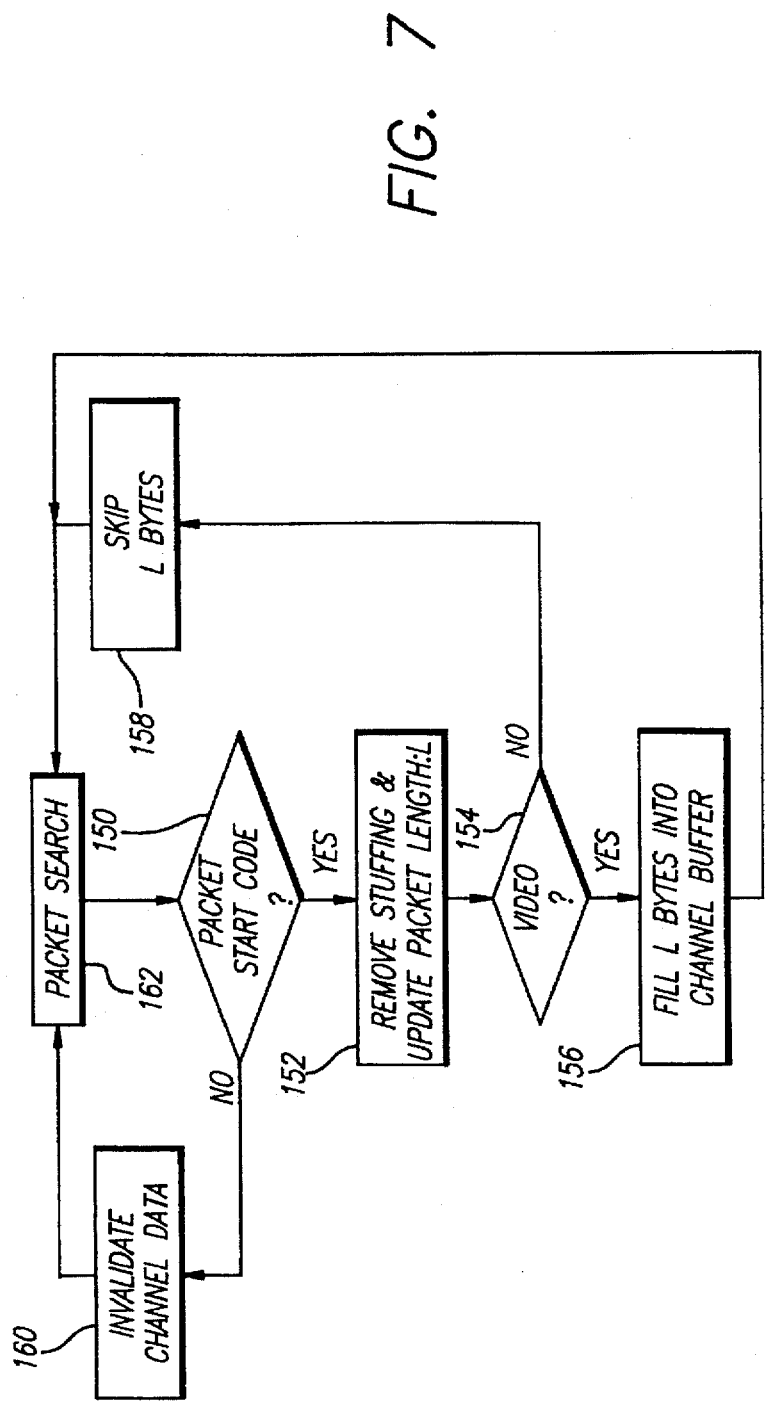

FIG. 6
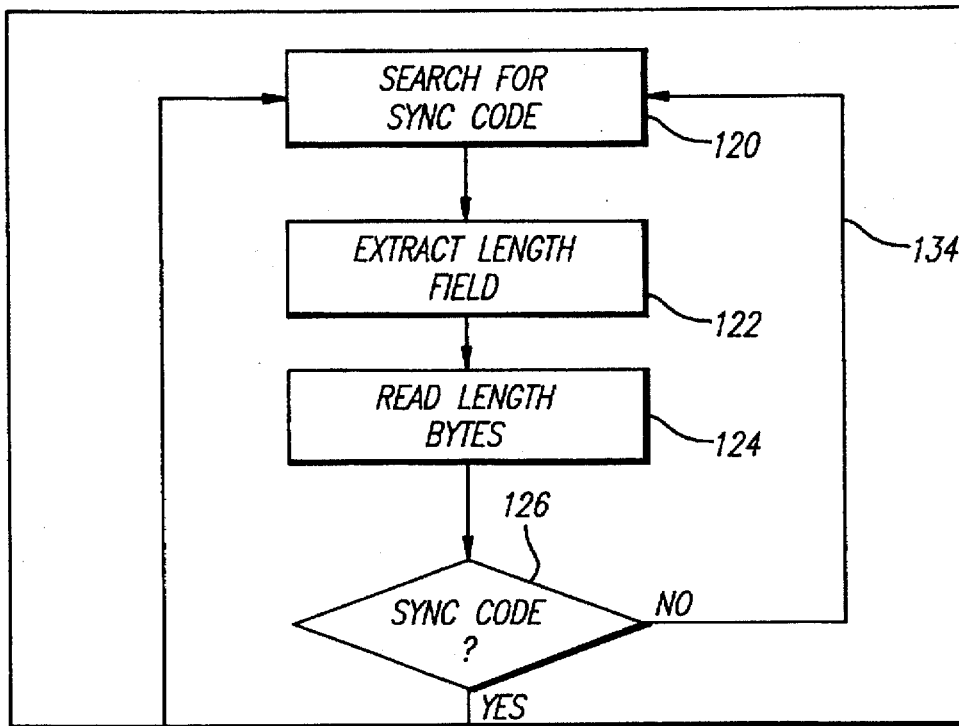
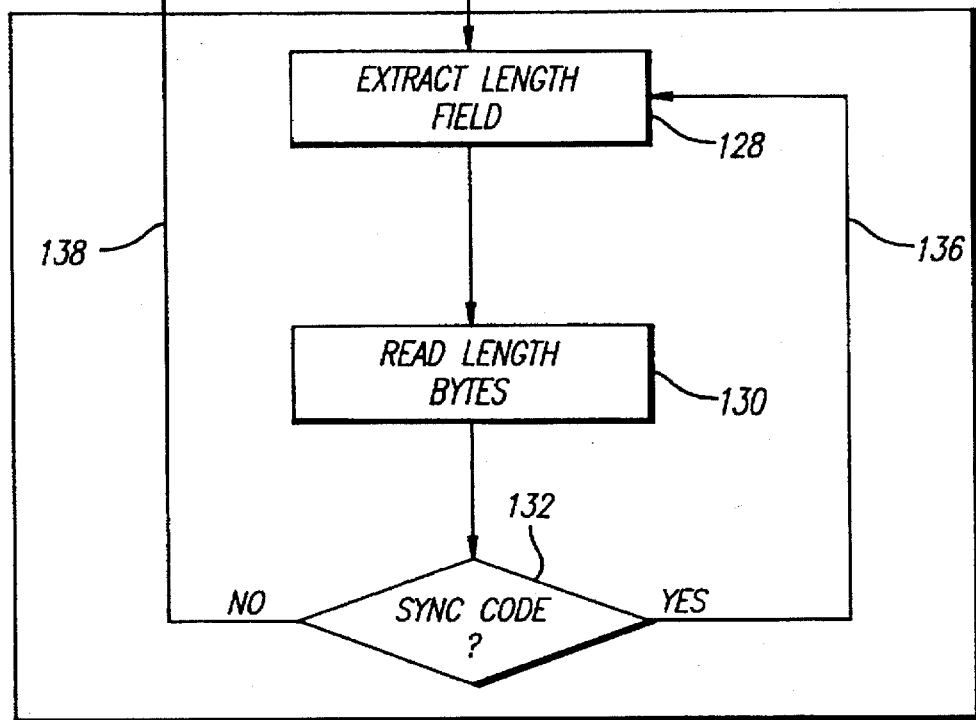

TWO-PART SYNCHRONIZATION SCHEME FOR DIGITAL VIDEO DECODERS

This application is a continuation of U.S. patent application Ser. No. 08/143,316, entitled a TWO-PART SYNCHRONIZATION SCHEME FOR DIGITAL VIDEO DECODERS, filed Oct. 25, 1993 by David R. Auld now U.S. Pat. No. 5,452,006.

FIELD OF THE INVENTION

The present invention relates generally to digital video data, and, more particularly, to an apparatus and method for synchronizing a video decoder to a compressed digitized video signal.

BACKGROUND OF THE INVENTION

In the communications industry, much attention has been focused on making more effective use of the limited number of transmission channels available for delivering video information and programming to an end user. Various methodologies have been developed to achieve an increase in the number of available transmission channels within the frequency bandwidth that was previously allocated to a single video transmission channel. An increase in the number of available transmission channels would allow the communications industry to reduce costs and to increase broadcast capacity. It has been estimated that a typical cable operator could have the capability to deliver as many as 500 channels to a home viewer.

A dramatic increase in the number of separate program channels that could be broadcast within the currently available transmission bandwidth may be realized by employing a process of compressing and decompressing video signals. Typically, the video and audio signals comprising a video program are converted into a digital format, compressed and encoded in accordance with an established compression algorithm or methodology. The compressed system signal or bitstream, which is understood to include a video portion, an audio portion, and other informational portions, may then be transmitted over existing television channels, cable television channels, satellite communication channels, and the like. A decoder is then typically employed to decompress and decode the received system signal in accordance with the same compression algorithm or methodology previously mentioned. The decoded video information may then be output to a display device, such as a television monitor.

VIDEO ENCODING

Video compression and encoding is typically performed by a video encoder. The video encoder normally implements a selected data compression algorithm that conforms to a recognized standard or specification agreed to among the senders and receivers of digital video signals. One such emerging standard developed by the Moving Pictures Experts Group, is generally referred to as the MPEG International Standard DIS 11172. The MPEG standard defines a format for compressed digital video which supports data rates of about 1 to 1.8 Mbps (Megabits per second), resolutions of about 352 pixels (picture elements) horizontally to about 288 lines vertically, picture rates of about 24 to 30 pictures per second, and several VCR-like viewing options such as Normal Forward, Play, Slow Forward, Fast Forward, Fast Reverse, and Freeze.

In order for a video signal to be compressed, it is typically sampled, digitized, and represented by luminance and color difference signals. The MPEG standard specifies that a luminance component (Y) of the video signal be sampled with respect to color difference signals (Cr, Cb) by a ratio of two-to-one (2:1). That is, for every two samples of the Y component, there is to be one sub-sample each of the Cr and Cb components. It has been determined that the 2:1 sampling ratio is appropriate because the human eye is much more sensitive to luminance (brightness) components than to color components. Video sampling takes place in both the vertical and horizontal directions. Once the video signal is sampled, it is reformatted, for example, into a non-interlaced signal. An interlaced signal is one that contains only part of the picture content (i.e. every other horizontal line) for each complete display scan. A non-interlaced signal, in contrast, is one that contains all of the picture content. After the video signal is sampled and reformatted, the encoder may process it further by converting it to a different resolution in accordance with the image area to be displayed. In doing so, the encoder must determine which type of picture is to be encoded. A picture may be considered as corresponding to a single frame of motion video, or to a frame of movie film. However, different types of picture types may be employed for digital video transmission. The most prevalent picture types are: I- Pictures (Intra-Coded Pictures) which are coded without reference to any other pictures and are often referred to as anchor frames; P-Pictures (Predictive-Coded Pictures) which are coded using motion-compensated prediction from the past I- or P-reference picture, and may also be considered anchor frames; and B-Pictures (Bi-directionally Predictive-Coded Pictures) which are coded using motion compensation from a previous and a future I- or P-Picture.

A typical coding scheme may employ a mixture of I-, P-, and B-Pictures. Typically, an I-Picture may occur every half a second, with two B-Pictures inserted between each pair of I- or P-Pictures. I-Pictures provide random access points within the coded sequence of pictures where decoding can begin, but are coded with only a moderate degree of compression. P-Pictures are coded more efficiently using motion compensated prediction from a past I- or P-Picture and are generally used as a reference for further prediction. B-Pictures provide the highest degree of compression but require both past and future reference pictures for motion compensation. B-Pictures are generally not used as references for prediction. The organization of the three picture types in a particular video sequence is very flexible. A fourth picture type is defined by the MPEG standard as a D-Picture, or DC-Picture, which is provided to allow a simple, but limited quality, Fast-Forward mode.

Once the picture types have been defined, the encoder may estimate motion vectors for each 16×16 macroblock in a picture. A macroblock consists of a 16-pixel by 16-line section of the luminance component (Y) and two spatially corresponding 8-pixel by 8-line sections, one for each chrominance component Cr and Cb. Motion vectors provide displacement information between a current picture and a previously stored picture. P-Pictures use motion compensation to exploit temporal redundancy, or lack of motion, between picture frames in the video. Apparent motion between sequential pictures is caused by pixels in a previous picture occupying different positions with respect to the pixels in a current macroblock. This displacement between pixels in a previous and a current macroblock is represented by motion vectors encoded in the MPEG bitstream. Typically, the encoder chooses which picture type is to be used for each given frame. Having defined the picture type, the encoder then estimates motion vectors for each 16×16 macroblock in the picture. Typically in P-Pictures, one vector is employed for each macroblock, and in B-Pictures, one or two vectors are used. When the encoder processes B-Pictures, it usually reorders the picture sequence so that a video decoder receiving the digital video signal operates properly. Since B-Pictures are usually coded using motion compensation based on previously sent I- or P-Pictures, the B-Pictures can only be decoded after the subsequent reference pictures (an I- or P-Picture) has been decoded. Thus, the sequence of the series of pictures may be re-ordered by the encoder so that the pictures arrive at the decoder in a proper sequence for decoding of the video signal. The decoder may then re-order the pictures in proper sequence for viewing.

As mentioned previously, a macroblock is a 16×16 region of video data, corresponding to 16 pixels in the horizontal direction and 16 display lines in the vertical direction. When sampling of a video frame is performed by the video encoder, every luminance component (Y) of every pixel in the horizontal direction of the frame is captured, and every luminance component of every line in the vertical direction of the frame is captured. However, only every other Cb and Cr chrominance component of the frame is similarly captured. The result is a 16×16 block of luminance components and two 8×8 blocks each of Cr and Cb chrominance component. Each macroblock of video data thus consists of a total of six 8×8 blocks (four 8×8 luminance blocks, one 8×8 Cr block, and one 8×8 Cb block). The spatial picture area covered by four 8×8 blocks of luminance occupies an area equivalent to the region covered by each of the 8×8 chrominance blocks. Since there are half as many chrominance samples needed to cover the same area, they fit into an 8×8 block instead of a 16×16 block.

For a given macroblock of video data, the encoder is programmed to select a coding mode depending on the picture type, the effectiveness of motion compensation in the particular region of the picture, and the nature of the signal within the block. After the coding method is selected, the encoder performs a motion-compensated prediction of the block contents based on past and/or future reference pictures. The encoder then produces an error signal by subtracting the prediction from the actual data in the current macroblock. The error signal is similarly separated into 8×8 blocks (four luminance blocks and two chrominance blocks). A Discrete Cosine Transform (DCT) may then be performed on each block to achieve further compression. The DCT operation converts an 8×8 block of pixel values to an 8×8 matrix of horizontal and vertical coefficients of spatial frequency. An 8×8 block of pixel values can subsequently be reconstructed by a video decoder performing an Inverse Discrete Cosine Transform (IDCT) on the spatial frequency coefficients.

Additional compression is provided through predictive coding since the difference in the average value of neighboring 8×8 blocks tends to be relatively small. Predictive coding is a technique employed to improve compression based on the blocks of pixel information previously operated on by an encoder. A prediction of the pixels values for a block yet to be encoded may be performed by the encoder. The difference between the predicted and actual pixel values may then be computed and encoded. This difference value represents a prediction error which may later be used by a video decoder to correct the information of a predicted block of pixel values.

In addition to the signal compression that is achieved by the encoding process itself, a substantial degree of intentional signal compression is achieved by a process of selecting a quantization step size, where the quantization intervals or steps are identified by an index. The quantization level of the coefficients corresponding to the higher spatial frequencies favors the creation of coefficient values of zero by choosing an appropriate quantization step size such that the human visual perception system is unlikely to notice the loss of a particular spatial frequency, unless the coefficient value for that spatial frequency rises above the particular quantization level chosen. The statistical encoding of the expected runs of consecutive zeroed-valued coefficients of higher-order coefficients accounts for considerable compression gain.

In order to cluster non-zero coefficients early in the series and to encode as many zero coefficients as possible following the last non-zero co-efficient in the ordering, the coefficient sequence is organized in a specified orientation termed zigzag ordering. Zigzag ordering concentrates the highest spatial frequencies at the end of the series. Once the zigzag ordering has been performed, the encoder typically performs "run-length coding" on the special frequency coefficients. This process reduces each 8×8 block of DCT coefficients to a number of events represented by a non-zero coefficient and the number of preceding zero coefficients. Because the high-frequency coefficients are more likely to be zero, run-length coding results in additional video compression.

The encoder may then perform Variable-Length Coding (VLC) on the resulting data. VLC is a reversible procedure for coding that assigns shorter code words to frequent events and longer code words to less frequent events, thereby achieving additional video compression. Huffman encoding is a particularly well-known VLC technique that reduces the number of bits necessary to represent a data set without losing any information. The final compressed video data is then ready to be transmitted to a storage device or over a transmission medium for reception and decompression by a remotely located decoder. The MPEG standard specifies a particular syntax for a compressed bitstream. The MPEG video syntax comprises six layers, each of which supports either a signal processing function or a system function. The MPEG syntax layers correspond to a hierarchical structure. A "sequence" is the top layer of the video coding hierarchy and consists of a header and some number of "Groups-of-Pictures" (GOPs). The sequence header generally initializes the state of the decoder, which allows the decoder to decode any sequence without being affected by past decoding history. A GOP is a random access point, that is, it is the smallest coding unit that can be independently decoded within a sequence. A GOP typically consists of a header and some number of "pictures." The GOP header contains time and editing information. As discussed previously, there are four types of pictures: I-Pictures, P-Pictures, B-Pictures, and D-Pictures. Because of the picture dependencies, the order in which the pictures are transmitted, stored, or retrieved, is not the display order, but rather an order required by the decoder to properly decode the pictures in the bitstream. For example, a typical sequence of pictures, in display order, might be shown as follows:

I B B P B B P B B P B B I B B P B B P 0 1 2 3 4 5 6 7 8 9 10 11 12 13 14 15 16 17 18

By contrast, the bitstream order corresponding to the given display order would be as follows:

I P B B P B B P B B I B B P B B P B B 0 3 1 2 6 4 5 9 7 8 12 10 11 15 13 14 18 16 17

Because the B-Pictures depend on a subsequent I- or P-Picture in display order, the I- or P-Picture must be transmitted and decoded before the dependent B-Pictures.

Each of the "picture" portions of a GOP in turn consist of a header and one or more "slices." The picture header contains time stamp, picture type, and coding information. A slice consist of an integral number of macroblocks comprising a picture and can be used by a video decoder to recover from decoding errors. Should the bitstream become unreadable within a picture, the decoder will normally be able to recover by waiting for the next slice, without having to drop the entire picture. A slice also includes a header that contains position and quantizer scale information. "Blocks" are the basic coding unit, and the DCT is applied at this block level. Each block typically contains 64 component pixels arranged in an 8×8 order. The pixel values are not individually coded, but are components of the coded block. A macroblock is the basic unit for motion compensation and quantizer scale changes. As discussed previously, each macroblock consists of a header and six component 8×8 blocks: four blocks of luminance, one block of Cb chrominance, and one block of Cr chrominance. The macroblock header contains quantizer scale and motion compensation information.

VIDEO DECODING

Video decoding is the inverse of video encoding and is employed to reconstruct a motion picture sequence from a compressed, encoded bitstream. The data in the bitstream is decoded according to the syntax defined in the data compression standard. The decoder must first identify the beginning of a coded picture, identify the type of picture, then decode each individual macroblock within a particular picture. If there are motion vectors and macroblock types (each of the picture types I, P, and B have their own macroblock types) present in the bitstream, they can be used to construct a prediction of the current macroblock based on past and future reference pictures that the decoder has already stored. Coefficient data is then inverse quantized and operated on by an inverse DCT (IDCT) process that transforms the macroblock data from the frequency domain to the time and space domain.

Once all the macroblocks have been processed by the decoder, the picture reconstruction is complete. If the picture just reconstructed is a reference picture (I-Picture), it replaces the oldest stored reference picture and is used as the new reference for subsequent pictures. As noted above the pictures may also need to be re-ordered before they are displayed in accordance with their display order instead of their coding order. After the pictures are re-ordered, they may then be displayed on an appropriate output device.

PRIOR ART DECODING SCHEMES

A typical and conventional video encoding and decoding scheme is shown in FIG. 1. An initial video signal 10 is input to a video assembler 12 wherein pictures or frames are assembled. The assembled pictures are then input into a video encoder 14 which compresses the video data in accordance with a selected compression algorithm. Similarly, an initial audio signal 16 is input into an audio assembler 18 wherein audio frames are assembled. The audio frames are then input to an audio encoder 20 for audio compression. A system clock 15 provides time stamp information which is incorporated into the encoded audio and video signals for synchronization purposes. The encoded video signal output from video encoder 14 and the encoded audio signal output from audio encoder 20 are then input to a buffer/multiplexer 22 to produce a multiplexed system bitstream. This multiplexed system bitstream may then be stored in a digital storage media 24 or transmitted along an appropriate transmission channel 24 for later reception, decoding, and display.

At a receiving end, a multiplexed system bitstream is typically written from a fixed rate channel 24 to a video channel buffer 26 and an audio channel buffer 32. The video portion of the multiplexed system bitstream is extracted by a video synchronizer 27 and then decoded by a video decoder 28. The decoded video information 30 may then be further processed by a display controller for eventual output to a video monitor. Similarly, an audio synchronizer 33 extracts from an audio buffer 32 the audio portion of the multiplexed system bitstream which may be decoded by an audio decoder 34 and made available for further processing at an audio output 36. A system time clock 38 provides a time base by which the video decoder 28 and audio decoder 34 remain in synchronization.

In FIG. 2, there is shown a portion of a conventional video compression/decompression system for processing the video component of an encoded multiplexed system bitstream. An encoded system bitstream, containing both video, audio, and other information, is typically written directly to a channel buffer 42 from a fixed rate channel 40. A synchronizer 44 receives the multiplexed system bitstream from the channel buffer 42 and pre-processes the system bitstream prior to its being input to a video decoder 46. Synchronization generally involves finding a unique pattern of bits, often termed sync codes or start codes, in the multiplexed system bitstream, and aligning the bitstream data following the sync code. The various groupings of bits making up the bitstream are often referred to as variable length symbols. These variable length symbols typically represent specific signal information in accordance with the syntax of the encoding and decoding algorithm employed, such as the MPEG standard. In the configuration illustrated in FIG. 2, both synchronization and decoding must proceed at a high rate of speed. Since the alignment of symbols in the channel buffer 42 is not known, rapid synchronization is difficult.

A conventional synchronizer 44 must normally perform two typically complex and time consuming operations at a relatively high processing rate. First, the synchronizer 44 must establish the alignment of the symbols from the channel buffer 42 before the decoder 46 can translate the symbols. Translation typically involves matching the symbols against a dictionary or set of look-up tables. The total throughput of the conventional video decoding scheme shown in FIG. 2 is normally limited by the speed of the synchronizer 44. This can easily lead to overflow or underflow of bitstream data in the channel buffer 42 and starvation of data to the decoder 46, making the decoding system unreliable. Second, the synchronizer 44 must evaluate and parse the multiplexed system bitstream to extract the relevant coded video data from the non-video data. In such a scheme, the video decoder 46 must analyze a voluminous amount of extraneous data, including the audio portion of the multiplexed system bitstream. The video decoder 46 typically must perform numerous unsuccessful look-ups to the symbol dictionary as it attempts to interpret the non-video data components of the system bitstream. Further, the likelihood of synchronization and decoding errors is significantly increased since the video decoder 46 must analyze and perform error checking on a substantial amount of non-video data. Recovery from decoding and channel errors is therefore generally more difficult and time-consuming. Also, the channel buffer 42 must be configured with sufficient memory capacity to store the non-video data components of the multiplexed system bitstream, even though such non-video components are subsequently discarded by video decoder 46.

In view of the difficulties discussed above, digital video signal transmission is still highly complex and expensive. Thus, there still exists in the communications industry a keenly felt need to increase the efficiency of video decoders while minimizing both the complexity and cost of effective implementations. The present invention fulfills this need.

SUMMARY OF THE INVENTION

Broadly, and in general terms, one aspect of the present invention provides an increased efficiency in decoding of variable bit-rate coded signals by employment of a novel signal synchronization scheme. A first synchronizer or pre-parser is first employed to synchronize to an initial variable bit-rate coded signal that is received from a transmission channel, and to parse a selected portion of the coded signal from this input. The synchronized portion of the variable bit-rate coded signal is then preferably transferred to a buffer for temporary storage and subsequently decoded by a decoder. Another aspect of the present invention concerns a novel two-part synchronization scheme for synchronizing in a bit-serial fashion to a variable bit-rate coded signal prior to transferring the coded signal to a channel buffer. Preferably, the synchronized portion of the variable bit-rate coded signal stored in the channel buffer is further parsed and translated by a second synchronizer when it is extracted from the channel buffer. The novel two-part synchronization scheme of the present invention ensures that the parsed portion of the variable bit-rate coded signal that is transferred to the channel buffer is properly aligned and synchronized. This pre-synchronization of the parsed portion of the variable bit-rate coded signal significantly reduces the complexity of the operations and circuitry of a decoding system that is used to subsequently decode the variable bit-rate coded signal.

In accordance with one aspect of the present invention, a multiplexed system bitstream, comprising at least an audio bitstream portion and a video bitstream portion, is input to a pre-parser through a fixed rate channel. A system bitstream synchronizer then initially aligns and synchronizes to the received multiplexed system bitstream. The system stream pre-parser also extracts the video bitstream portion from the multiplexed system bitstream. A video stream synchronizer then analyzes the video bitstream for the presence of a video sync code. The various layers comprising the video bitstream are subsequently synchronized and aligned by a video stream pre-parser. Preferably, the parsed video bitstream is then bit-serially written to a channel write FIFO (First-in-First-Out) buffer prior to being transferred to a channel buffer.

Another aspect of the present invention concerns the source of the video bitstream operated on by the video stream pre-parser. Preferably, a video stream multiplexer is provided to switchably select between a number of bitstream sources. In one embodiment of the present invention, a video stream multiplexer can be employed to provide access to a multiplexed system bitstream from a fixed rate channel or other transmission channel, or, alternatively, to a secondary video bitstream source. One such secondary video bitstream source, for example, may be a CD-ROM or other digital storage media.

Still another aspect of the novel two-part synchronization scheme involves a post-parser, which receives the synchronized video bitstream from the FIFO channel buffer. The multi-bit symbol parallel post-parser further parses the various layers comprising the video bitstream and translates the encoded video data to corresponding video symbols. In one embodiment, each layer comprising the video bitstream has a corresponding look-up table or dictionary stored in the parallel post-parser. The resultant video symbols may then be organized and decoded to reconstruct the encoded picture or frame. Other data contained in the video bitstream not directly utilized to perform picture reconstruction are preferably written to a user data FIFO and an auxiliary data FIFO. The data stored in these FIFOs are preferably accessible by a system controller which may extract the data for further processing.

Another aspect of the present invention concerns the independent operation of the pre-parser with respect to operations by the post-parser. The pre-parser operates on a multiplexed system bitstream or video bitstream to produce a parsed and synchronized bitstream which is subsequently bit-serially written to a channel buffer. The post-parser is preferably coupled to the decoder in a parallel fashion. In this regard, the post-parser operates on the synchronized video bitstream received from the channel buffer in a parallel manner and at a significantly higher rate of speed compared to the operational speed of the pre-parser. This de-coupling of the pre-parser and the post-parser results in a significant simplification of the design of the pre-parser, channel buffer, post-parser, and the video decoder. A concomitant reduction in design and production costs with respect to the aforementioned components is also realized.

The novel features of the present invention will be better understood from the following detailed description, considered in connection with the accompanying drawings. It should be expressly understood, however, that the drawings are for purposes of illustration and description only, and are not intended as a definition of the limits of the present invention.

BRIEF DESCRIPTION OF THE DRAWINGS

FIG. 3 is a block diagram of one embodiment of a novel two-part video synchronization scheme in accordance with one aspect of the present invention;

FIG. 6 is a state diagram illustrating a synchronization process of the novel pre-parser aspect of the present invention;

FIG. 7 is a flow diagram depicting the video parsing operation of the pre-parser in accordance with one embodiment of the present invention.

DETAILED DESCRIPTION OF THE PREFERRED EMBODIMENT

Figures 1, 2:
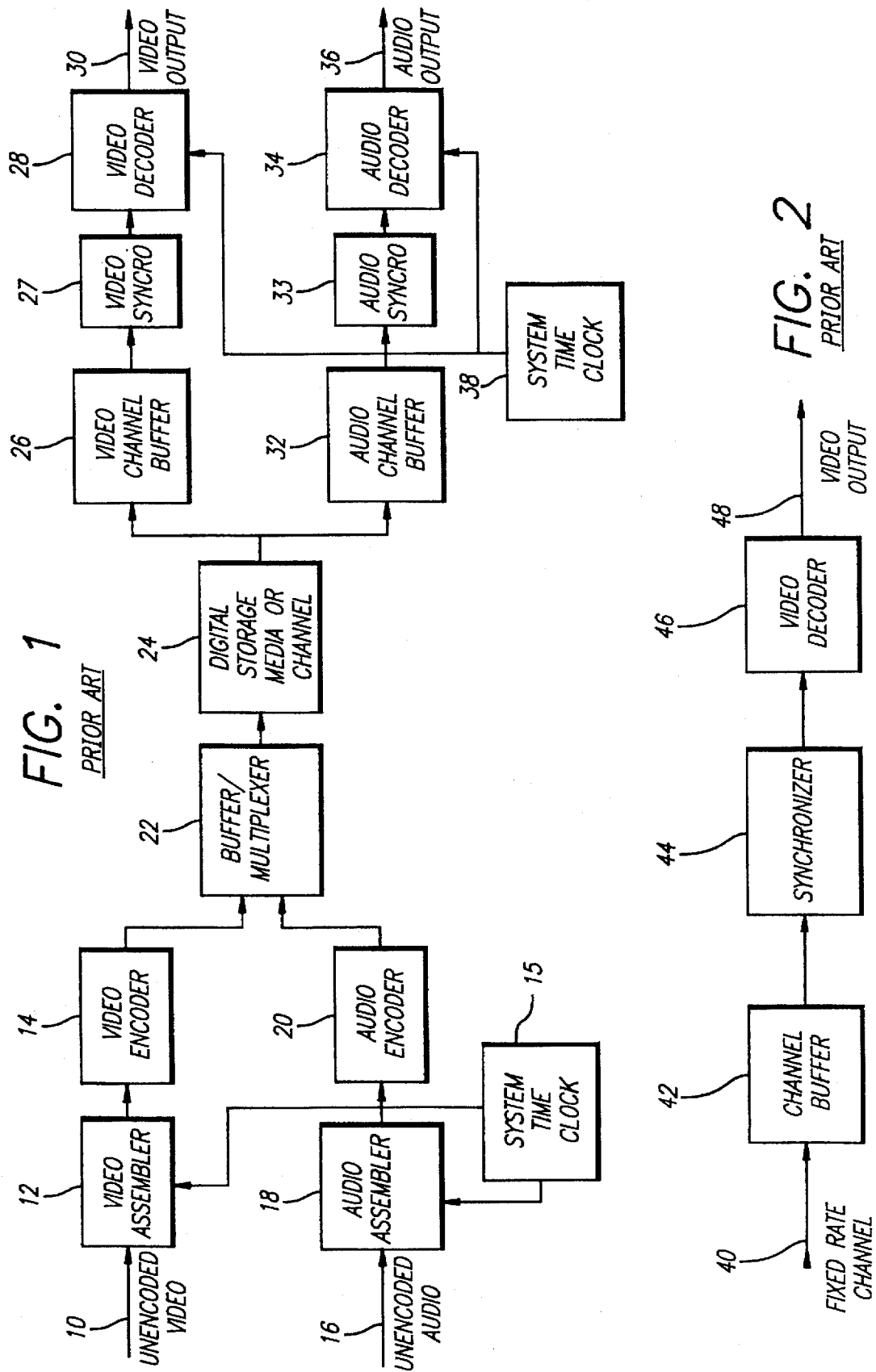
FIG. 1 is a block diagram of a conventional video encoding and decoding scheme.
FIG. 2 is a block diagram representative of a conventional synchronization scheme for a digital video decoder.

Referring to the figures, and more particularly to FIG. 3, there is shown a block diagram illustrating a novel video decoding architecture in accordance with one aspect of the present invention. In a preferred embodiment, synchronization to a variable bit-rate coded signal is accomplished in a two-part process performed by a pre-parser 52 and a post-parser 56. In accordance with this aspect of the present invention, an initial multiplexed system bitstream, preferably transmitted along a fixed rate channel 50, is coupled to the pre-parser 52. The pre-parser 52 performs an initial set of operations on the bitstream which is then written to the channel buffer 54. The post-parser 56 operates on the bitstream data after reading it from the channel buffer 54.

The pre-parser 52 performs an initial channel synchronization to the multiplexed system bitstream received from the fixed rate channel 50. Preferably, data is only written to the channel buffer 54 if the pre-parser 52 is synchronized to the bitstream. Additionally, the pre-parser 52 effectively filters the bitstream and removes unwanted digital information in the bitstream corresponding to signal components irrelevant to video image data decoding such as audio and other non-video related information. The filtered video bitstream is then temporarily stored in the channel buffer 54 to await further processing. The operations performed by the post-parser 56 and the video decoder 58 are significantly simplified since the video bitstream stored in the channel buffer 54 is already synchronized and properly aligned.

Figure 4:
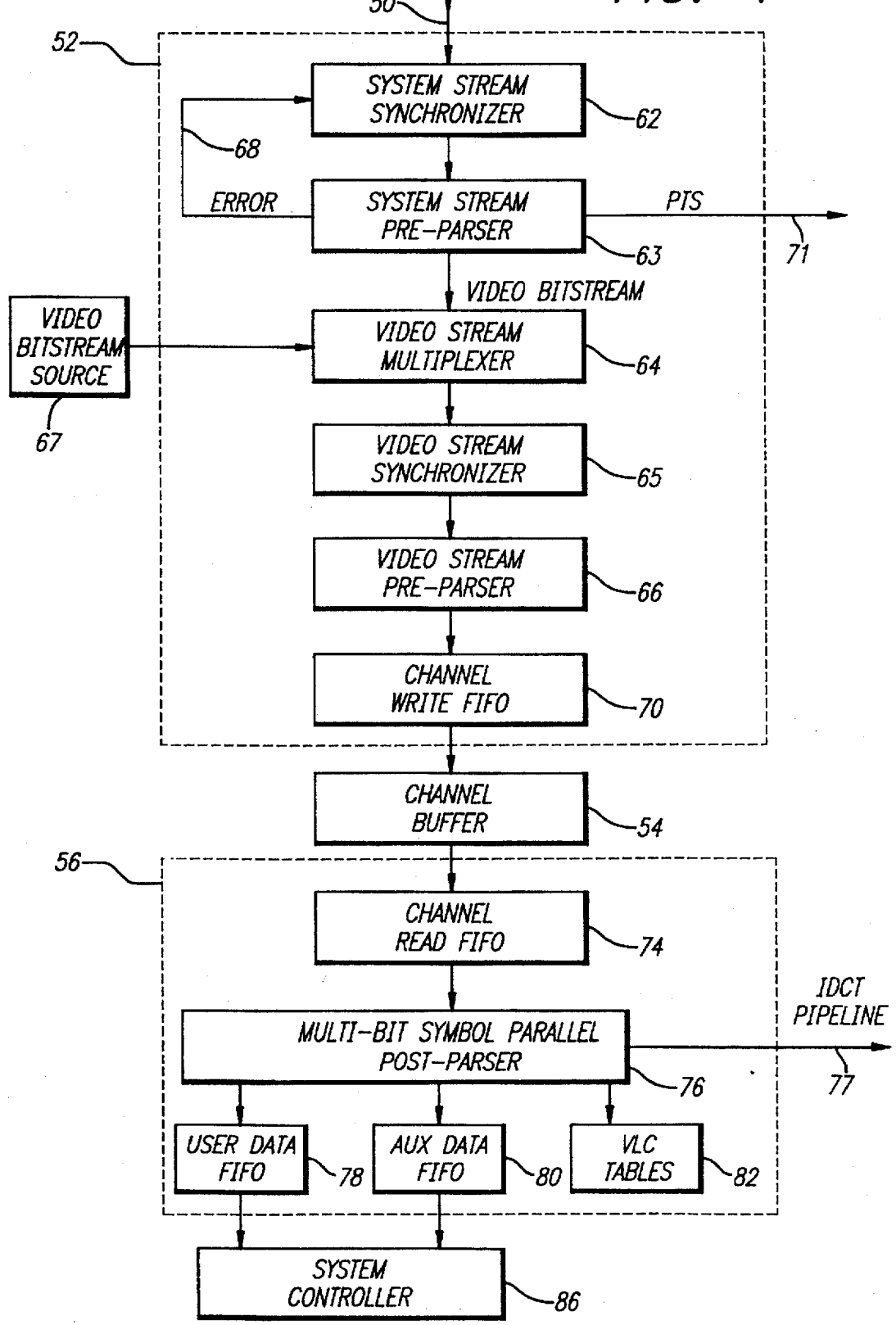
FIG. 4 is a block diagram representative of the synchronization processes of a novel two-part synchronization scheme of the present invention.

In FIG. 4, there is shown a block diagram representative of the processes performed by the novel two-part synchronization of the present invention. Alignment, synchronization, and parsing of a multiplexed system bitstream is performed in two phases; the first by a pre-parser 52, and second by a post-parser 56. Disposed between the pre-parser 52 and the post-parser 56 is a channel buffer 54. In operation, an initial multiplexed system bitstream is input to the pre-parser 52 along a fixed rate channel 50. Within the pre-parser 52, a system stream synchronizer 62, coupled to input channel 50, synchronizes to the multiplexed system bitstream. A system stream pre-parser 63 then separates the video signal component, commonly referred to as a video bitstream, from the multiplexed system bitstream and extracts the Presentation Time Stamp. The Presentation Time Stamp is a parameter used for subsequent re-synchronizing of the audio and video components.

The pre-parser 52 preferably has the capability to process a bitstream from several sources, including a multiplexed system bitstream from a fixed rate channel 50, and a video bitstream from an external source 67, such as a CD-ROM or other digital storage media. In one embodiment of the present invention, a video stream multiplexer 64 can be instructed to accept a video bitstream from either the system stream pre-parser 63 or from the external video bitstream source 67. The video bitstream may then be synchronized by a video stream synchronizer 65, then aligned and parsed by a video stream pre-parser 66. The parsed video bitstream output from the video stream pre-parser 62 is then preferably written to a channel write FIFO register or buffer 70 which temporarily stores the video bitstream data prior to writing the data to a channel buffer 54.

As further illustrated in FIG. 4, the post-parser 56 receives the parsed video bitstream data from the channel buffer 54. This parsed video bitstream may first be input to a channel read FIFO 74 within the post-parser 56. A multi-bit symbol parallel post-parser 76 then accesses the video bitstream data from channel read FIFO 74 for further processing of the data. In accordance with some data encoding approaches, the video bitstream may include various data not directly used in the reconstruction of a video picture or frame. This data may be temporarily stored in a user data FIFO 78 or an auxiliary data FIFO 80, depending on the nature of the data, for later use in the decoding process or for access by an external system controller 86. The multi-bit symbol parallel post-parser 76 preferably interacts with a variable length code (VLC) dictionary 82 or set of look-up tables. The variable length codes comprising the video bitstream are parsed by the parallel post-parser 76 by extracting out the various layers comprising the video bitstream for subsequent translation. A number of error checking and recovery procedures are also executed by the parallel post-parser 76. The resultant parsed video information may then be output to the IDCT (Inverse Discrete Cosine Transform) pipeline 77 for later reconstruction of the picture.

Figure 5:
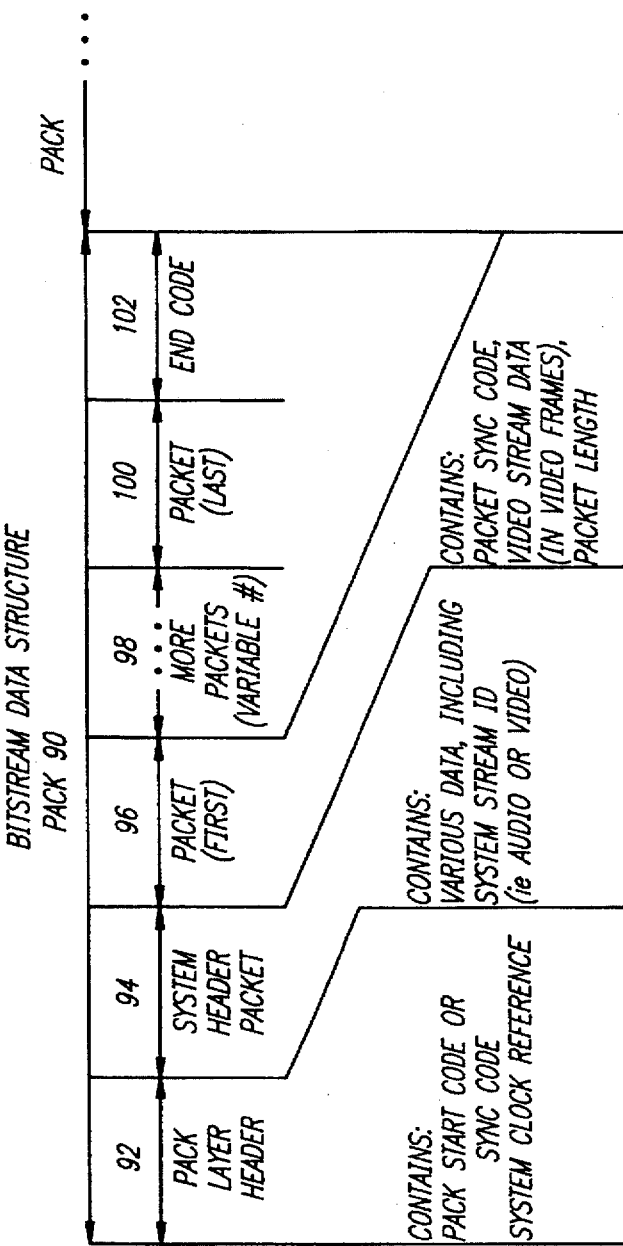
FIG. 5 is a graphic representation of the data structure comprising an MPEG compliant multiplexed bitstream.

In one embodiment of the present invention, the multiplexed system bitstream is of a type conforming to the MPEG standard. It should be understood, however, that variable bit-rate coding schemes other than those conforming to the MPEG standard or those currently employed in the compression and decompression of video signals may be employed without departing from the scope and spirit of the present invention. The logical structure of a typical MPEG system bitstream is illustrated in FIG. 5, which represents the highest level MPEG data structure, and is often termed an ISO (International Standards Organization) system stream. An MPEG ISO system bitstream typically includes a sequence of packs 90. A typical pack 90, in turn, includes a sequence pack layer headers 92, a system header packet 94, a sequence of packets 96, 98, and 100, and an end code 102. The pack layer header 92 contains a pack start code, or sync code, used for synchronization purposes, and a system clock value. The system header packet 94 contains a variety of information commonly referred to as system housekeeping data, and a system stream ID which is used to differentiate among multiple system streams. A sequence of one or more packets typically contains either encoded audio or encoded video stream data. The final element of a pack 90 is an end code 102. It should be noted that any one packet 96, 98, 100 may carry either audio or video data, but not both simultaneously. With respect to a packet containing video data, typically a video packet header and one or more video frames is contained within the packet. Further illustrated in FIG. 5 are the hierarchical layers comprising a video packet 96. The various layers comprising the video data stream include a sequence layer, a group of pictures layer, a picture layer, a slice layer, a macroblock layer, and a block layer. The functions associated with each of these layers is also provided in FIG. 5. It should be noted that each packet or layer may contain one or more synchronization codes, referred to in the art as sync code, which are necessary to properly synchronize and align the encoded bitstream.

A state diagram showing the system synchronization process is shown in FIG. 6. Assuming, for example, that the system synchronizer 62 is not synchronized to the bitstream, the system synchronizer 62 searches for a sync code, or start code, comprising the packet layer 96, as at 120. The length field of the packet layer 96 is then extracted, and the length of the packet data field is read, as at 122 and 124 respectively. The packet data field of the packet layer 96 may contain emulations of the sync codes of other bitstream data, such as those comprising audio packets. The system synchronizer 62, however, analyzes the bitstream to determine whether a legitimate video packet sync code has been located, as at 126. If either the video sync code has not been located or a sync code emulation is located, the system synchronizer 62 will continue to predict the occurrence of a legitimate video sync code in the bitstream. This prediction is based on the length field of the previously occurring header. The system synchronizer 62 then proceeds to repeat the sync code searching process, as at 134. If a sync code is located within the bitstream, as at 126 and 132, the length of the field in bytes is extracted and read, as at 128 and 130 respectively. When the sync code is located, as at 126 and 132, the bitstream is considered synchronized. The system synchronizer 62 will then attempt to locate the sync code of the next packet, as at 136. If no sync code can be located for the next packet 98, the system synchronizer 62 begins to search for a sync code and the bitstream transitions from a synchronized state to a non-synchronized state, as at 138.

One important advantage of the present invention concerns the alignment and synchronization of a multiplexed system bitstream received from a fixed rate channel 50 by the pre-parser 52. As shown in FIG. 4, the system stream synchronizer 62 aligns the multiplexed system bitstream with respect to sync words embedded in the system bitstream data. Synchronization involves the alignment of data within a packet relative to the position of a sync word within the bitstream. A typical sync word may be represented by a 24-bit or 32-bit word made up of consecutive zeros and ending with a "1" bit. Alignment involves the recognition of word or byte boundaries within a system bitstream in accordance with the syntax of the selected compression algorithm. The location of sync words distributed within the system bitstream delineates the boundaries between informational word groupings within the packet. These word groupings conform to the particular grammar and syntax rules dictated by the compression algorithm employed for data encoding. Once aligned, the organization of the data structure comprising a particular informational word grouping following a sync code is thus of an established format. In a preferred embodiment, the system stream synchronizer 62 performs synchronization and alignment in a serial fashion, one bit at a time. The synchronized system bitstream is then processed by the system stream pre-parser 63.

Turning now to FIG. 7, there is shown a flow diagram illustrating the process of extracting the video bitstream component of a multiplexed system bitstream that is performed by the system stream pre-parser 63. The system stream pre-parser 63 is intended to pass only the video bitstream component of a multiplexed system bitstream. Any non-video information components, such as the audio portion of the system bitstream, are discarded by the system stream pre-parser 63. Essentially, the packet sync code, stream ID, and packet length information at the packet layer are used to identify the type of packet being analyzed, and to skip any non-video packets. When a packet sync code has been located, as at 150, so-called stuffing data is removed, and the length of the packet data field is updated to reflect the decrease in length of the packet word resulting from the removal of the stuffing data, as at 152. Stuffing data, also referred to as stuffing bits or stuffing bytes, are typically code words that may be inserted into a compressed bitstream to increase the bit rate of the stream to that required by the digital storage or transmission medium. The stuffing data may later be discarded by the decoder during the decoding process.

After removal of the stuffing data and updating the length of the packet data field, the stream ID of the packet is read to determine whether the bitstream is a video bitstream, as at 154. If the system ID indicates that the bitstream does indeed contain video data, the data representative of the video information is transferred to the channel buffer 54, as shown at 156. If the system ID indicates that the packet does not contain video data, the number of bytes comprising the non-video data are skipped, as at 158, and subsequent packets are searched, as at 162. If a packet sync code cannot be located, the data in the fixed rate channel 50 is considered invalid and is purged, as at 160, and subsequent packet searching continues, as at 162.

While the system synchronizer 62 may initially synchronize incorrectly to a video bitstream, the probability of incorrect synchronization occurring is very low. Incorrect synchronization may occur as a result of data emulating video start codes, or sync codes, in the packet data field of a packet 96. In order to mis-synchronize, the system synchronizer 62 must find a second sync code after discarding the "length" bits of the packet data field, as at 158 of FIG. 7. Preferably, the "length" field is represented by a 16-bit symbol, and the sync code is represented by a 32-bit symbol. Assuming that the bits in the data field of the packet layer 96 arrive in random order, that is, "0" and "1" bits are equally probable, the mis-synchronization sequence just described has a probability of $0.5^{48}=3.55 \times 10^{-15}$. With a bitstream rate of 15 megabytes per second, a mis-synchronization failure would occur every $18.7 \times 10^6$ seconds, which is approximately 217 days. Note that any mis-synchronization failures can occur only if the system synchronizer 62 is not already synchronized to the bitstream. If such a failure is encountered, the system synchronizer 62 can subsequently reacquire synchronization within a period roughly equivalent to the time required to analyze two packets of data.

Another aspect of the present invention concerns a video bitstream synchronizer 65 as shown in FIG. 4. As discussed previously, the system stream pre-parser 63 passes only the video packet data field of the packet layer 96 to the video stream synchronizer 65. The video sequence layer, which is the first layer in the video data syntax hierarchy, also contains a header which the video stream synchronizer 65 attempts to locate within the video bitstream. The parsed video data layers may then be written to a channel write FIFO 70 one bit at a time, and subsequently transferred to the channel buffer 54 in a similar manner.

Error propagation due to the emulation of non-video sync codes is generally not a concern with respect to the video bitstream input to the video stream synchronizer 65 and video stream pre-parser 66. Once the system stream pre-parser 63 parses the video bitstream from the multiplexed system bitstream, non-video sync codes generally are not present in the video bitstream. The emulation of non-video sync codes associated with conventional decoding schemes results from mis-interpreting audio and other non-video bitstream sync codes as legitimate video bitstream sync codes. Since these extraneous non-video bitstreams have, in accordance with the present invention, been stripped from the system bitstream by the system stream pre-parser 63, it is highly unlikely that such errant sync codes could remain within the video bitstream. Moreover, in the event that the video stream synchronizer 65 locates an unexpected legitimate sync code within the video bitstream, the video stream synchronizer 65 will synchronize to this unexpected sync code. Thus, synchronization of the video bitstream would simply be established earlier than expected, and would not result in the propagation of a synchronization error into the post-parser 56.

Another important advantage of the two-part synchronization scheme of the present invention concerns the substantial simplification of the post-parser 56 circuitry design, and that of the video decoder 58. As discussed previously, the pre-parser 52 establishes alignment and synchronization to the video bitstream prior to buffering the video bitstream in the channel buffer 54. The pre-parser 52 is preferably a bit-serial parser which can accept a multiplexed system bitstream from a serial fixed rate channel 50. The pre-parser 52 examines the system bitstream one bit at a time, and at the average channel rate of the fixed rate channel 50. The average channel rate of the fixed rate channel 50 is normally significantly slower than the processing rate of the post-parser 56 and decoder 58, both of which must operate at a rate sufficient to ensure proper decoding and reconstruction of each encoded frame or picture. By examining the multiplexed system bitstream from a fixed rate channel in a bit-serial fashion, the system stream synchronizer 62 can easily locate the sync codes and ensure proper alignment and synchronization to the multiplexed system bitstream. Although operating in a serial mode, the pre-parser 52 can thus perform all required alignment, synchronization, and parsing functions without adversely affecting the efficiency of the decoding process.

In one embodiment of the present invention, the pre-parser 52 utilizes a channel clock, operating at the rate of the fixed rate channel 50, and the decoder clock operating at a significantly higher rate. Re-synchronization between the pre-parser 52 and channel buffer 54 preferably occurs at the input of the channel write FIFO 70. An additional transition clock operating at an intermediate rate may be employed to facilitate re-synchronization as the data is transferred from the relatively low speed pre-parser 52 to the relatively high-speed channel buffer 54. The channel buffer 54 is also preferably constructed to manage 64-bit words. Rather than performing re-synchronization bit by bit, the re-synchronization occurs with respect to every sixty-four bits of data. In this fashion, re-synchronization occurs at a rate Sixty-four times slower than the rate re-synchronization would occur on a word length of one bit.

Another important aspect of the present invention concerns the addition and operation of a multi-bit symbol parallel post-parser 76. The parallel post-parser 76 parses the layers comprising the video bitstream, beginning with the video sequence layer, by synchronizing on a sync code embedded in the sequence layer. If the parallel post-parser 76 is synchronized to the video sequence layer, and if no errors have been detected, parsing of the group of pictures (GOP) layer then ensues. The parallel post-parser 76 enters the picture layer from the GOP layer if no errors have been detected in the GOP header. Errors found in the bitstream syntax, or other errors occurring from processing of the GOP layer header, are not typically maskable. Such errors are typically flagged as decode errors. Error recovery however, requires waiting for a new GOP sync code or sequence layer sync code. Errors in the header of the picture layer normally have different propagation effects depending on the picture coding type. However, because an error in the picture header would usually result in the transmutation of the picture type to another picture type, all errors in the picture layer header are typically flagged as decode errors. Error recovery requires waiting for a new picture layer, GOP layer, or video sequence layer. Errors in the slice layer and lower syntax layers are also usually concealed by using the last anchor frame, with any motion compensation corrections made by referencing the last correct motion vector.

Figure 8:
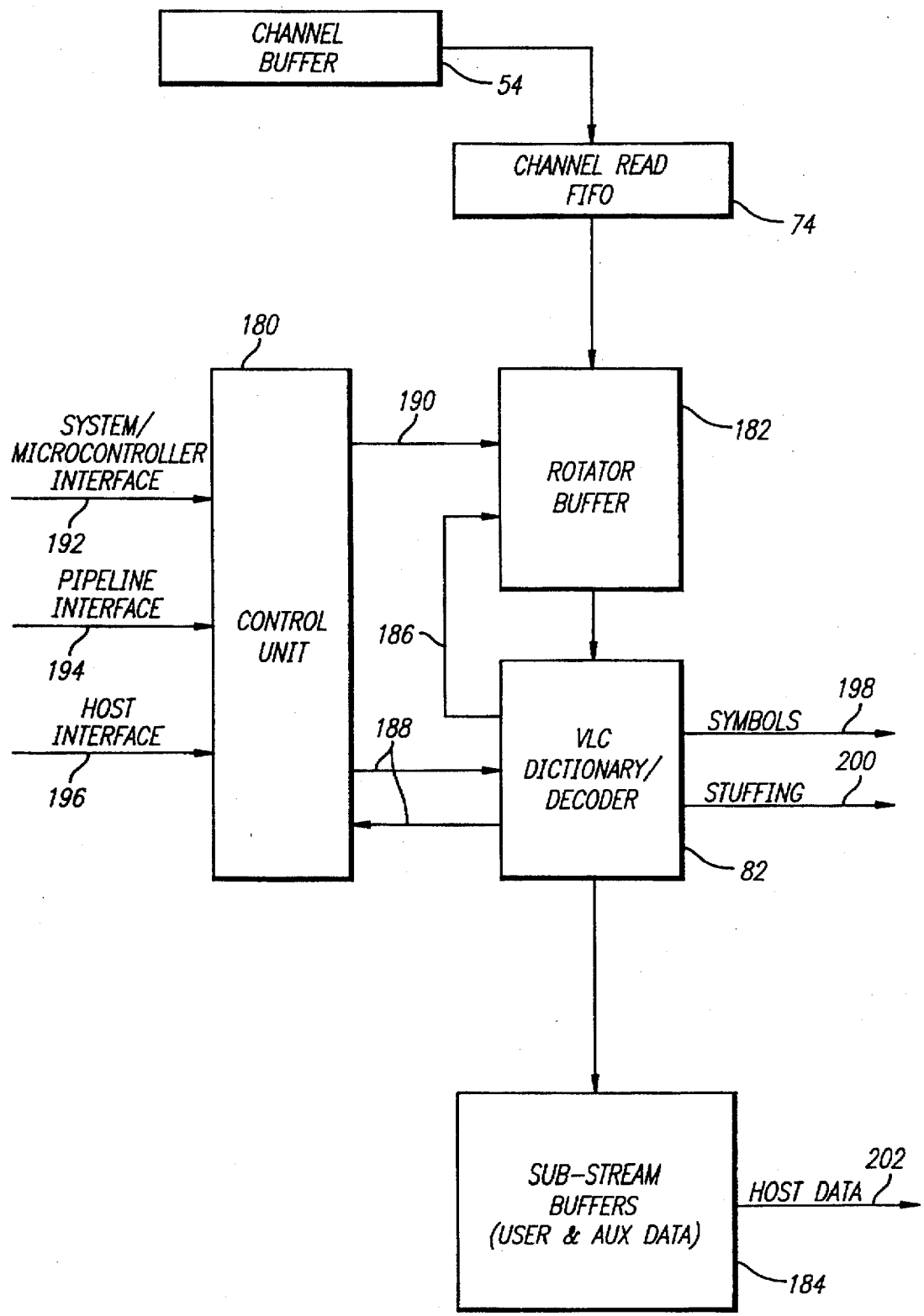
FIG. 8 is a block diagram representative of the component blocks comprising the post-parser in accordance with one embodiment of the present invention.

The multi-bit symbol parallel post-parser 76 is essentially a one-event per cycle parser that performs look-ups and translations with respect to the video bitstream and the VLC tables 82. A block diagram depicting a multi-bit symbol parallel post-parser 76 is provided in FIG. 8. The parallel post-parser 76 is preferably comprised of three groups of buffers; a rotator buffer 182 for bit extraction, a VLC dictionary/decoder 82 used for symbol translations, and a control unit 180. The VLC dictionary/decoder 82 examines a field of contiguous bits from the channel read FIFO 74. The particular operation mode of the VLC dictionary/decoder 82 and the bit field size are preferably determined by a four-bit operation code input from a microcontroller 192 which is coupled to the control unit 180. The control unit 180 controls the VLC dictionary/decoder 82 through control lines 188. The parallel post-parser 76 parses the five layers of video information comprising the video bitstream by comparing the bitstream to the five variable length code (VLC) tables comprising the VLC dictionary/decoder 82. The translated VLC symbols 198, also referred to as events, may then be transferred to the video decoder 58 for subsequent frame reconstruction. Any residual stuffing data 200 may also be discarded.

In addition to interpreting and translating the video bitstream, the parallel post-parser 76 further detects decode errors in the bitstream by checking for correct grammar and syntax with respect to the compression algorithm. The parallel post-parser 76 may generate a maskable interrupt if a decode error is found. Depending on the context of the error, the parallel post-parser 76 may perform error concealment to prevent the erroneous data from reaching the video decoder 58. Errors occurring in the channel buffer 54 typically occur due to an overflow or underflow of data in the channel buffer 54. The parallel post-parser 76 therefore generates a maskable interrupt during normal operation if the channel buffer 54 becomes full or empty. However, in a properly designed system, the channel buffer 54 is seldom full, if ever full, and should only become empty if the parallel post-parser 76 loses synchronization. When an error is flagged, data continues to be decoded at the channel rate up to the next appropriate sync code for a particular layer. A microcontroller 192 typically determines the error masking strategy. After an error, or if the parallel post-parser 76 is not synchronized, the post-parser 56 reads data at a rate of one bit per cycle from the channel buffer 54 until synchronization is reacquired. The post-parser 56 preferably re-synchronizes to any sync symbol in the channel buffer 54, regardless of its alignment. If the post-parser 56 is not synchronized, it reads data from the channel buffer 54 at the maximum rate until it either regains synchronization or the channel buffer 54 empties. If the post-parser 56 receives a media error code or flag, it attempts to conceal errors up to the next sync code. The post-parser 56 uses the sync codes or symbols in the channel buffer 54 to keep track of the current grammar layer of the video bitstream. The post-parser 56 also attempts to conceal errors either flagged as media errors in the bitstream or found to be errors during decoding at the slice layer and lower syntax layers.

It will, of course, be understood that various modifications and additions can be made to the preferred embodiments of the present invention discussed above without departing from the scope or spirit of the present invention. Accordingly, the scope of the present invention should not be limited by the particular embodiments discussed above, but should be defined only by the claims set forth below and equivalents thereof.

What is claimed is:

1. A Motion Picture Experts Group (MPEG) data transmission system, comprising:
   a transmitter including an encoder for encoding data in accordance with an MPEG standard for producing and transmitting a multiplexed bitstream, said multiplexed bitstream including:
   video bitstream data; and
   non-video bitstream data;
   a communications channel for carrying the multiplexed bitstream from the transmitter; and
   a receiver for receiving the bitstream from the communications channel, the receiver including:
   a channel buffer;
   a pre-parser for parsing the multiplexed bitstream, separating the video bitstream data from the non-video bitstream data, and storing the separated video bitstream data in the channel buffer; and a post-parser for reading the video bitstream data from the channel buffer, and parsing and translating the video bitstream data to produce video symbols.

2. A system as in claim 1, in which the receiver further comprises a decoder for decoding the video symbols to produce video data.

3. A system as in claim 1, in which:

the pre-parser stores the video bitstream data in the channel buffer in series; and the post-parser reads the video bitstream data from the channel buffer in parallel.

4. A system as in claim 3, in which the post-parser reads the video bitstream data from the channel buffer at a higher rate than the pre-parser stores the video bitstream in the channel buffer.

5. A system as in claim 1, in which the pro-parser and the post-parser operate independently of each other.

6. A system as in claim 1, in which the pre-parser synchronizes and aligns the video bitstream data in the channel buffer.

7. A system as in claim 1, in which the pre-parser synchronizes to and extracts a presentation time stamp from the multiplexed bitstream for synchronizing the video bitstream.

8. A system as in claim 1, in which the non-video bitstream data comprises audio bitstream data.

9. A system as in claim 1, in which the non-video bitstream data comprises stuffing bitstream data.

10. A system as in claim 1, in which:

the video bitstream data comprises a plurality of layers; and the post-parser parses each of the layers to produce the video symbols.

11. A system as in claim 10, in which the post-parser parses synchronization codes from each of the layers.

12. A system as in claim 1, in which the receiver further comprises a multiplexer for selectively connecting an input of the pre-parser to the communications channel or to an external bitstream source.

13. A system as in claim 12, in which the external bitstream source comprises a digital data storage unit.

14. A system as in claim 1, in which the post-parser further synchronizes the video symbols.

15. A Motion Picture Experts Group (MPEG) video data receiver for receiving a multiplexed bitstream which is encoded in accordance with an MPEG standard and includes video bitstream data and non-video bitstream data, comprising:

a channel buffer;

a pre-parser for parsing the multiplexed bitstream, separating the video bitstream data from the non-video bitstream data, and storing the seperated video bitstream data in the channel buffer; and a post-parser for reading the video bitstream data from the channel buffer, and parsing and translating the video bitstream data to produce video symbols.

16. A receiver as in claim 15, further comprising a decoder for decoding the video symbols to produce video data.

17. A receiver as in claim 15, in which:

the pre-parser stores the video bitstream data in the channel buffer in series; and the post-parser reads the video bitstream data from the channel buffer in parallel.

18. A receiver as in claim 17, in which the post-parser reads the video bitstream data from the channel buffer at a higher rate than the pre-parser stores the video bitstream in the channel buffer.

19. A receiver as in claim 15, in which the pre-parser and the post-parser operate independently of each other.

20. A receiver as in claim 15, in which the pre-parser synchronizes and aligns the video bitstream data in the channel buffer.

21. A receiver as in claim 15, in which the pre-parser synchronizes to and extracts a presentation time stamp from the multiplexed bitstream for synchronizing the video bitstream.

22. A receiver as in claim 15, in which the non-video bitstream data comprises audio bitstream data.

23. A receiver as in claim 15, in which the non-video bitstream data comprises stuffing bitstream data.

24. A receiver as in claim 15, in which:

the video bitstream data comprises a plurality of layers; and the post-parser parses each of the layers to produce the video symbols.

25. A receiver as in claim 24, in which the post-parser parses synchronization codes from each of the layers.

26. A receiver as in claim 15, in which the receiver further comprises a multiplexer for selectively connecting an input of the pre-parser to the communications channel or to an external bitstream source.

27. A receiver as in claim 26, in which the external bitstream source comprises a digital data storage unit.

28. A receiver as in claim 15, in which the post-parser further synchronizes the video symbols.

* * * * *

(12) EX PARTE REEXAMINATION CERTIFICATE (8739th)

United States Patent
Auld

(10) Number: US 5,686,965 C1
(45) Certificate Issued: Dec. 13, 2011

(54) TWO-PART SYNCHRONIZATION SCHEME FOR DIGITAL VIDEO DECODERS

(75) Inventor: David R. Auld, San Jose, CA (US)

(73) Assignee: LSI Logic Corporation, Milpitas, CA (US)

Reexamination Request:
No. 90/011,662, Apr. 27, 2011

Reexamination Certificate for:
Patent No.: 5,686,965
Issued: Nov. 11, 1997
Appl. No.: 08/529,687
Filed: Sep. 18, 1995

Related U.S. Application Data

(63) Continuation of application No. 08/143,316, filed on Oct. 25, 1993, now Pat. No. 5,452,006.

(51) Int. Cl.
*H04N 7/12* (2006.01)

(52) U.S. Cl. .................... 375/240.01; 348/462; 348/465
(58) Field of Classification Search ........................ None
See application file for complete search history.

(56) References Cited

To view the complete listing of prior art documents cited during the proceeding for Reexamination Control Number 90/011,662, please refer to the USPTO's public Patent Application Information Retrieval (PAIR) system under the Display References tab.

*Primary Examiner* — Andrew Nalven

(57) ABSTRACT

A novel synchronization scheme for use in connection with digital signal video decoder comprises a pre-parser, a channel buffer, and a post-parser. The pre-parser synchronizes to a multiplexed system bitstream received from a fixed rate channel. The video bitstream component of a multiplexed system bitstream is then extracted and synchronized prior to being transferred bit-serially from the pre-parser to a channel buffer. The post-parser is coupled to the channel buffer and to a video decoder in a series configuration. The post-parser separates the various layers of video data from the video bitstream component. The post-parser performs a translation operation on the video bitstream component and converts the bitstream data into symbol data. The symbol data is subsequently processed by the video decoder so as to reconstruct an originally encoded picture or frame. Preferably, the multiplexed system bitstream data structure conforms to some format agreed upon among video digital businesses involved in transmission and reception. In accordance with one aspect of the present invention, the pre-parser and the post-parser operate independent of each other, and operate at different processing rates.

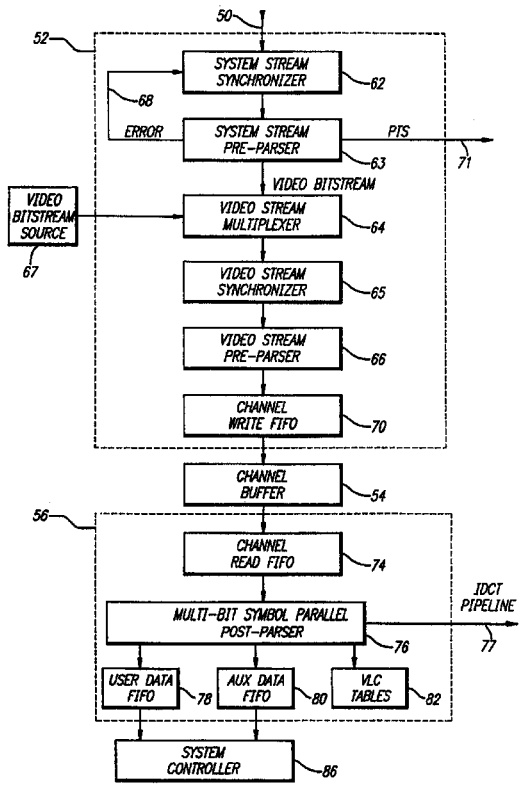

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 2, 6, 8, 9 and 14 is confirmed.

Claims 5 and 15 are determined to be patentable as amended.

Claims 16, 19, 20, 22, 23 and 28, dependent on an amended claim, are determined to be patentable.

New claims 29 and 30 are added and determined to be patentable.

Claims 3, 4, 7, 10-13, 17, 18, 21 and 24-27 were not reexamined.

5. A system as in claim 1, in which the [pro-parser] *pre-parser* and the post-parser operate independently of each other.

15. A Motion Picture Experts Group (MPEG) video data receiver for receiving a multiplexed bitstream which is encoded in accordance with an MPEG standard and includes video bitstream data and non-video bitstream data, comprising:

a channel buffer;

a pre-parser for parsing the multiplexed bitstream, separating the video bitstream data from the non-video bitstream data, and storing the [seperated] *separated* video bitstream data in the channel buffer; and a post-parser for reading the video bitstream data from the channel buffer, and parsing and translating the video bitstream data to produce video symbols.

*29. A system as in claim 1, in which:*

*a pre-parser stores the video bitstream data in the channel buffer in series; and the post-parser reads the video bitstream data from the channel buffer in parallel, and*

*in which the pre-parser and the post-parser operate independently of each other,*

*in which the pre-parser synchronizes and aligns the video bitstream data in the channel buffer,*

*in which the video bitstream data comprises a plurality of layers, and*

*in which the post-parser parses each of the layers to produce the video symbols.*

*30. A receiver as in claim 15, in which:*

*the pre-parser stores the video bitstream data in the channel buffer in series; and*

*the post-parser reads the video bitstream data from the channel buffer in parallel, and*

*in which the pre-parser and the post-parser operate independently of each other, and*

*in which the video bitstream data comprises a plurality of layers and*

*in which the post-parser parses each of the layers to produce the video symbols.*

* * * * *